United States Patent
Sharp et al.

(10) Patent No.: US 9,980,020 B1
(45) Date of Patent: May 22, 2018

(54) REMOTE LOCKING SYSTEM ARCHITECTURE AND USER INTERFACE

(71) Applicant: Snap-on Incorporated, Kenosha, WI (US)

(72) Inventors: William T. Sharp, Pleasant Prairie, WI (US); David Doerflinger, Racine, WI (US); Daniel Eggert, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days. days.

(21) Appl. No.: 15/393,878

(22) Filed: Dec. 29, 2016

(51) Int. Cl.
*E05B 45/06* (2006.01)
*H04Q 9/02* (2006.01)
*G08B 13/06* (2006.01)
*H04W 88/02* (2009.01)

(52) U.S. Cl.
CPC ............... *H04Q 9/02* (2013.01); *G08B 13/06* (2013.01); *H04W 88/02* (2013.01)

(58) Field of Classification Search
CPC .......................... G07C 9/00563; A47G 29/10
USPC ........................................................ 340/542
See application file for complete search history.

(56) References Cited

U.S. PATENT DOCUMENTS

| | | | | |
|---|---|---|---|---|
| 2003/0102970 A1* | 6/2003 | Creel | ................... | G06K 17/00 340/568.1 |
| 2008/0246587 A1* | 10/2008 | Fisher | ................... | A47G 29/10 340/5.73 |
| 2008/0258869 A1* | 10/2008 | Ognjenovic | ........... | A47G 29/10 340/5.73 |
| 2009/0267731 A1* | 10/2009 | Moritou | .................. | H04M 1/67 340/5.28 |
| 2011/0185779 A1* | 8/2011 | Crass | ..................... | B25H 3/028 70/158 |
| 2016/0055694 A1* | 2/2016 | Saeedi | ............... | G07C 9/00087 340/5.52 |

* cited by examiner

*Primary Examiner* — Fabricio R Murillo Garcia
(74) *Attorney, Agent, or Firm* — Seyfarth Shaw LLP

(57) ABSTRACT

A remote locking system for a storage unit that allows a user device including a security token to remotely lock or unlock the storage unit. The user can include software or an application that communicates with the storage unit to provide locking statuses and tamper alerts for the storage unit. The storage unit can include a proximity sensor so the unit is unlocked when an authorized user device is within a certain distance of the storage unit. The system can further include a timer that disables communication between the user device and storage unit after a predetermined inactive period, so as to reduce cross-talk and power consumption.

14 Claims, 5 Drawing Sheets

REMOTE LOCKING SYSTEM ARCHITECTURE AND USER INTERFACE

TECHNICAL FIELD OF THE INVENTION

The present invention relates generally to a locking system. More particularly, the present invention relates to a remote locking system for a storage unit.

BACKGROUND OF THE INVENTION

Toolboxes typically carry valuable or expensive items, such as tools, and are therefore locked or otherwise secured when not in use. Conventional toolbox locks are well known and include a simple lock and key mechanism to prevent theft or unauthorized access to the interior of the toolbox. Other locks include combination or digital keypad locks that receive input from a user to confirm the user is authorized to access the contents of the toolbox.

More recent developments in toolbox securement include remote activation of a lock. For example, U.S. Pat. No. 8,720,239 (the "'239 Patent") includes an electromechanical actuator that locks or unlocks a toolbox. The actuator in the '239 Patent allows for either manual activation of the lock (e.g., in a conventional lock and key system) or wireless activation of the lock (e.g., with a remote actuator). When actuated, a lock bar causes the lock to maintain the toolbox in a locked, closed position to prevent unauthorized individuals from accessing the toolbox contents.

Recent developments has consolidated wireless devices into a smartphone for many purposes. Smartphone applications communicate to other electronic devices, or other smartphones, using the wireless technology within the phone itself. This wireless communication can be Bluetooth, Wi-Fi, cellular, radio, infrared, or any other form of communicative system.

SUMMARY OF THE INVENTION

The present invention broadly comprises a remote locking system for a storage unit, for example a toolbox, that includes associated software to enable a user to use a mobile device (e.g., smart phone) to remotely lock and unlock the storage unit. For example, the mobile device can include an application that provides locking and unlocking commands, locking status and tamper alerts for the storage unit. The system can include a proximity sensing feature so the storage unit is unlocked when an authenticated user is nearby, for example, when the user is within a certain proximity of or touches the storage unit. The storage unit can further include a timer or switch to disable communication between the mobile device and storage unit to reduce power consumption, eliminate cross-talk or otherwise control when the storage unit can be accessed. A wireless transceiver, such as Wi-Fi, Bluetooth, cellular, or other, is disposed inside the storage unit for wireless communication, and a data storage medium can store a table of lock/unlock commands, authentication codes with associated users and data logging, such as user access.

In an embodiment, the present invention broadly includes a storage unit, such as a tool storage unit or toolbox, having a housing for storing objects, a lock for maintaining the housing in a closed state when the lock is in the locked state, and for allowing access to the interior of the housing when the lock is in the unlocked state, a transceiver operably coupled to the lock and adapted to receive a lock command from a user device to cause the lock to enter either of the locked or unlocked states, and a sensor for sensing a proximity of a user device and communicating an unlock signal to the lock if the user is authorized and within a preset proximity of the sensor.

Further disclosed is a method for securing a storage unit, such as a tool storage unit or tool box, including providing a housing with a lock, the housing is adapted to house objects, such as tools, and the lock is adapted to maintain the housing in a closed, locked state to prevent access to the interior of the housing, or an unlocked state to allow access to the housing, receiving a lock command from a user device to cause the lock to enter either of the locked or unlocked states, sensing a proximity of a user device, and communicating an unlock signal to the lock if the user is within a preset proximity of the sensor.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
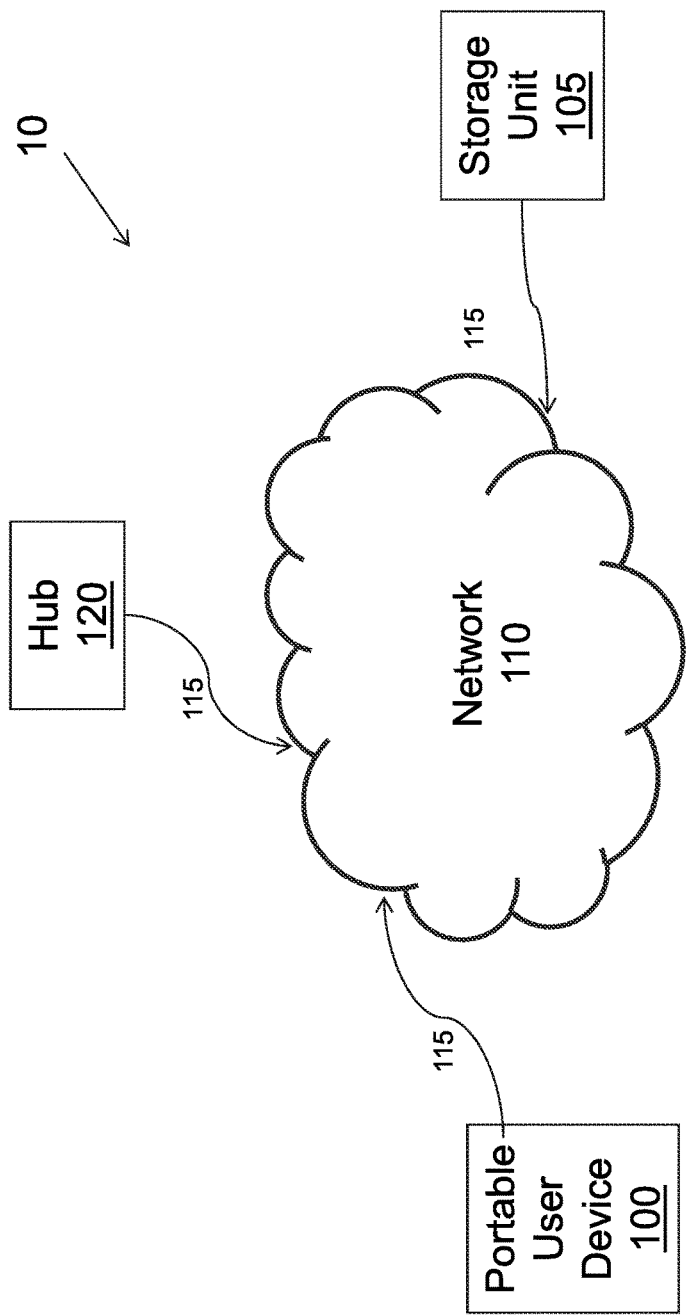
FIG. 1 is a schematic illustration of a system according to an embodiment of the present invention.

While the present invention is susceptible of embodiments in many different forms, there is shown in the drawings, and will herein be described in detail, embodiments, including a preferred embodiment, of the invention with the understanding that the present disclosure is to be considered as an exemplification of the principles of the invention, and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a remote locking system for a storage unit, such as, for example, a tool storage unit, tool cabinet, or toolbox, that allows a user device that includes a security token, such as a smart phone or other mobile device, to remotely lock and unlock the storage unit. The user device can also include an application or other software that provides lock statuses, tamper alerts, lock commands, and open/closed statues for the storage unit. In an embodiment, the storage unit can include a proximity sensor so the unit is unlocked when an authenticated user device is nearby or touches the storage unit. A timer can further be provided to disable communication between the user device and storage unit as a "sleep mode" that reduces cross-talk and power consumption and maintains a desired status of the storage unit independent of commands received from an authorized user device, such as, for example, providing access to the storage unit only during certain times of the day.

As shown in FIG. 1, in an embodiment, the present invention broadly includes a system 10 can include a portable user device 100 that includes a security token, such as, for example, a smart phone, a smart watch, key fob, etc., a storage unit 105 for storing items, such as tools, and a network 110 having communication links 115 to operably couple the user device 100 to the storage unit 105. In an embodiment, a hub 120, such as a server, can be included as part of the system 10 and assist communication between the user device 100 and storage unit 105.

The user device 100 can be a device of any type that includes a security token and allows wireless communication. By way of example, the user device 100 can include a smart phone (e.g. iPhone®), smart watch, key fob, personal computer, voice and video telephone set, streaming audio and video media player, integrated intelligent digital television receiver, work station, radio, personal digital assistant (PDA), mobile satellite receiver, GPS receiver, software system, or any combination of the above. Further details of the user device 100 will be discussed below with respect to FIG. 2.

The storage unit 105 can be any device or enclosure capable of enclosing tools or other objects. For example, the storage unit 105 can be a toolbox, tool cabinet, or can be any other enclosure, regardless of whether it is capable of holding tools. The storage unit 105 includes a housing for storing such objects.

The network 110 may be a single network or a plurality of networks of the same or different type. For example, the network 110 may be a data network, a telephone network, an intranet, Internet, cellular data network, Bluetooth, general packet radio service (GPRS), or a telecommunications network operably coupled to a data network. Any combination of telecommunications and data networks may be used without departing from the spirit and scope of the present invention.

The communication links 115 can be any form of communicative link, whether wired or wireless, between two or more objects. For example, the communication links 115 can be Wi-Fi, cellular, Bluetooth®, radio, or any other form of communication. For the purpose of discussion, the communication links 115 will be described as wireless, but the communication link 115 can be also be a hard-wired functionality.

As discussed above, the hub 120 can be a server. However, the hub 120 can be any device capable of assisting communication between the user device 100 and storage unit 105. Further details of the hub 120 will be discussed below with respect to FIG. 4.

Figure 2:
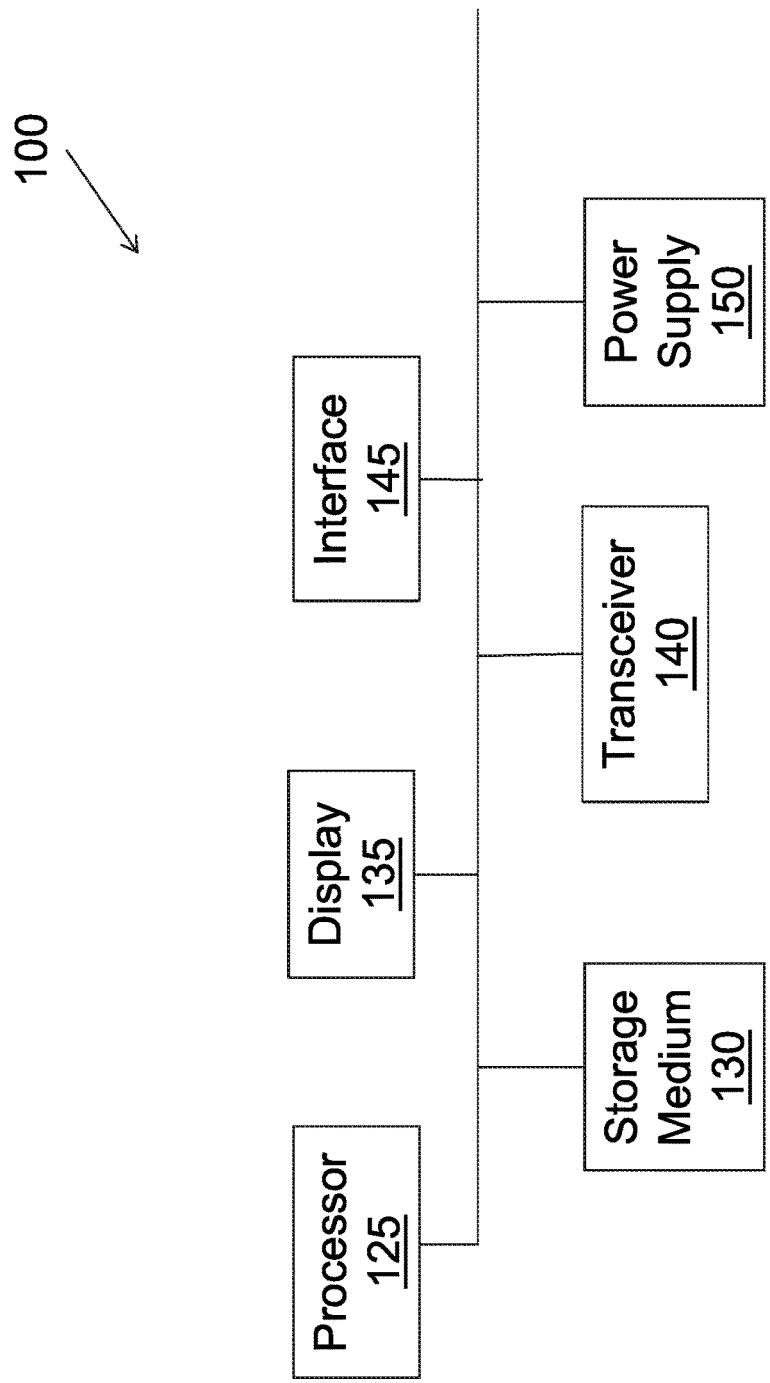
FIG. 2 is a schematic illustration of a user device according to an embodiment of the present invention.

Referring to FIG. 2, in an embodiment, the user device 100 includes a processor 125 for carrying out instructions stored on a storage medium 130, and a display 135 for displaying information to the user. The user device 100 can also include a transceiver 140 for sending and receiving information, for example, communicating with the storage unit 105. An interface 145 can be provided for receiving commands from the user, and a power supply 150 can also be implemented to power the user device 100.

The processor 125 facilitates communication between the various components of the user device 100 and between the user device 100 and other devices, such as the storage unit 105. The processor 125 can be any type of processor or processors that alone or in combination facilitate communication within the user device 100 and, together with the transceiver 140, transmit information from the user device 100 to external devices. For example, the processor 125 can be a desktop or mobile processor, a microprocessor, a single-core or a multi-core processor.

The storage medium 130 can be any non-transitory computer-readable recording medium capable of storing data. By way of example, and not limitation, the storage medium 130 can be a hard drive, DVD, CD, flash drive, volatile or non-volatile memory, RAM, or any other type of data storage. As used throughout this application, the term "non-transitory computer-readable recording medium" excludes only signals and carrier waves, per se, and is not meant to exclude other types of memory that may be considered "transitory" such as RAM or other forms of volatile memory.

The display 135 can display various information for the user to view and interpret, including information received from the storage unit 105 or hub 120, or requests to input information via the interface 145. By way of example, the display 135 can include a liquid crystal display (LCD), organic light emitting diode (OLED) display, plasma screen, cathode ray tube display, or any other kind of black and white or color display that will allow the user to view information on the user device 100.

The transceiver 140 can be any device that can transmit data from the user device 100 or can receive data within the user device 100 from an external data source. By way of example, the transceiver 140 can be any type of radio transmission antenna, cellular antenna, hardwired transceiver, or any other type of wired or wireless transceiver capable of communicating with an external device. As discussed herein, the user device 100 and storage unit 105 can communicate in any manner, for example, Wi-Fi, cellular, Bluetooth®, radio, remote keyless entry (RKE), public key cryptography (PKE), near field communication (NFC), ZigBee, or wired connection.

The interface 145 can be any panel or screen capable of receiving information from the user and storing, transmitting, or interpreting such information. By way of example, and not limitation, the interface 145 can include a touch screen display, keyboard, voice recognition system, fingerprint recognition system, optical recognition system, proximity sensor, biometric indicia interface, or any other interface that allows the user to enter information into the system 10 and cause the system 10 to act based on that information.

The power supply 150 can be any device capable of supplying the user device 100 with power. For example, the power supply 150 can be a lithium ion or nickel cadmium battery, fuel cell, wired power connection (e.g. conventional AC power), wireless power connection, or any other form of power supply capable of powering the components 125-145 of the user device 100. For the purposes of discussion, the power supply 150 will be assumed to be a battery.

Figure 3:
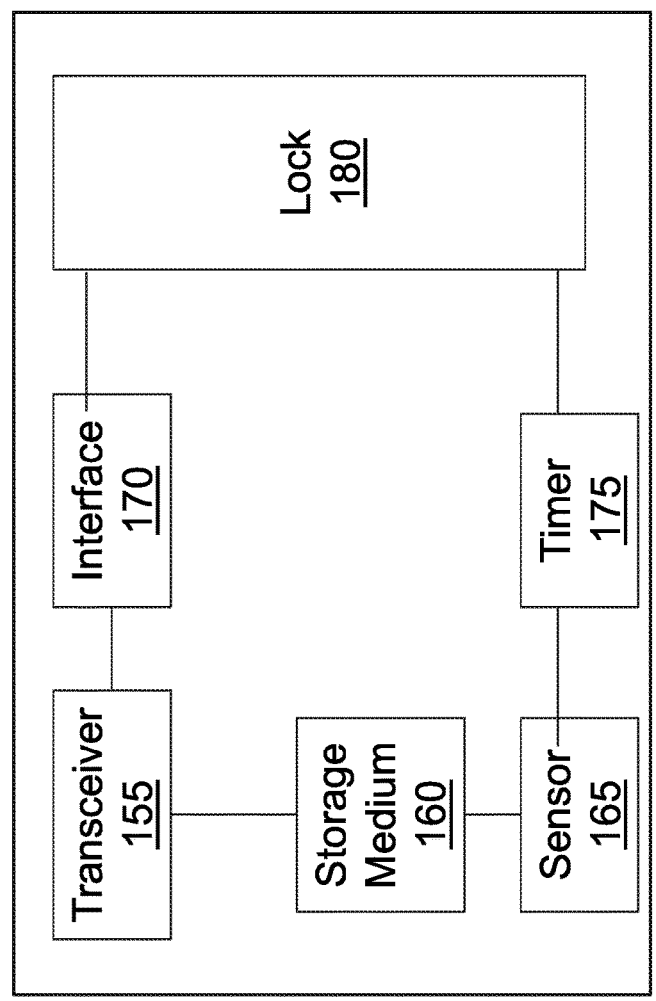
FIG. 3 is a schematic illustration of a storage unit according to an embodiment of the present invention.

FIG. 3 illustrates a storage unit 105 according to an embodiment of the present invention. In an embodiment, the storage unit 105 includes a transceiver 155 for communicating with external devices (for example, the user device 100), a storage medium 160 for storing data, and a sensor 165 for sensing the proximity of user devices that respectively include authenticated security tokens. Alternately, the user can enter information into a toolbox interface 170 to lock or unlock the storage unit 105. The storage unit 105 further includes a timer 175 for determining an amount of time in which the transceiver 155 has been inactive or has not received a communication from a user device 100. A lock 180 is also implemented within the storage unit 105 to maintain the storage unit 105 in a closed state.

The toolbox transceiver 155 and storage medium 160 can be any device discussed above with respect to the transceiver 140 and storage medium 130, respectively. The toolbox transceiver 155 communicates with external devices, for example, the user device 100. The toolbox transceiver 155 can therefore receive a command from the security token in a user device 100 to unlock the lock 180. The command can be any form, for example, a signal from the user device 100 to lock or unlock the lock 180, or an indication of the proximity of the user device 100 as sensed by the sensor 165. The toolbox transceiver 155 can also communicate information to the user device 100, such as a tamper alert and the users who recently unlocked the storage unit 105. In some embodiments, the toolbox transceiver 155 can be located inside the storage unit 105 to prevent unauthorized access and tampering.

The storage medium 160 can store any information helpful to the operation of the system 10. For example, the storage medium 160 can store a table identifying users who recently unlocked the storage unit 105, a list of identification numbers corresponding to authorized users, a time stamp for when the storage unit 105 was unlocked, a table for when the storage unit 105 was tampered with, the type of input (e.g., manual, automatic, proximity sensor) that produced an unlock signal to the lock 180, or any other information.

In an embodiment, the storage medium 160 can be operatively connected to the toolbox transceiver 155 so that information stored on the toolbox storage medium 160 can be transmitted to a remote device, such as the user device 100, and alert the user. For example, the storage medium 160 can store information relating to tamper attempts. Such information can include attempts by unauthorized individuals to access the storage unit 105 by attempting to disable the lock 180 in any manner. The user can therefore view a user device 100, where tamper information was previously sent from the storage unit 105 to the user device 100, and remotely determine whether the storage unit 105 has been tampered with. Additionally, the user can view the user device 100 and determine a lock state of the storage unit 105 because the lock state can be stored in the storage medium 160 and transmitted to the user device 100. Any other relevant information can be stored within the storage medium 160 and transmitted to the user device 100, or another external device, without departing from the spirit and scope of the present invention.

The sensor 165 can be any type of sensor capable of sensing a proximity of a user. For example, the sensor 165 can be a proximity sensor that senses a user device having an authenticated security token within a certain proximity of the storage unit 105. The sensor 165 can sense the GPS coordinates of the user, or a more finite location of the user, in any known manner. For example, the sensor 165 can send a signal to the user device 100 and receive a signal from the user device 100 within a certain distance between the user device 100 and storage unit 105. When the user approaches the storage unit 105 within a certain predetermined distance, the storage unit 105 can sense the proximity of the user via the sensor 165, and, if the security token in the user device 100 is authenticated, automatically unlock the lock 180 without any action on the part of the user. In some embodiments, the sensor 165 can be a so-called "touch to open" sensor that senses the proximity of the user and, if the user device 100 includes an authenticated security token, then touches a button or handle on the storage unit 105 after being sensed, the sensor 165 can cause the storage unit 105 to enter the unlocked mode. The user can therefore unlock the storage unit 105 simply by having their smart phone in their pocket, and the user's hands can be free during the process.

Alternately, or in addition to the above, the sensor 165 (or an additional sensor) can sense an attempted tampering of the system 10. For example, the sensor 165 can sense if a user attempts to disable the lock 180 or transceivers 140, 155, 190. The user device 100 can then be alerted of such tampering, as discussed below in more detail. The sensor 165 could also determine whether the storage unit 105 is open or closed, so the storage unit 105 would only be locked if in the closed state. That is, the sensor 165 could determine whether the storage unit 105 is open or closed, and send a signal to allow the locking of the storage unit 105 only if the storage unit 105 is in the closed state. If the storage unit 105 is in the open state when a lock signal is received, the sensor 165 can cause or allow a signal to be sent to the user device 100 indicating the open status, and that the storage unit 105 was not locked.

The storage unit 105 can also include a timer 175 for determining a time in which the lock 180 is in an unlocked condition. The timer 175 determines the amount of time between locks and unlocks, and cause the lock 180 to automatically lock when the timer 175 reaches a predetermined time between the prior unlock signal. For example, the timer 175 can cause the lock 180 to enter the locked mode if the timer 175 determines it has been five minutes since the prior unlock signal. In an embodiment, the storage unit 105 also includes sensors to determine the open/closed condition of the storage unit 105, to ensure that the lock is placed in the locked condition when the drawers to the storage unit 105 are closed. In this manner, the timer 175 can cause the lock 180 to lock if the user forgot to re-lock the lock 180 after an initial lock command. Further, the timer 175 can prevent unnecessary communication between the storage unit 105 and user device 100, or other devices, by disabling the toolbox transceiver 155 after a predetermined amount of time since the prior unlock command. This process further eliminates cross-talk and unnecessary power usage, or maintain a locked condition regardless of authenticated user devices 100 nearby. Alternately, a switch can be provided to disable the toolbox transceiver 155 or lock the lock 180 so that any of the above objectives can be achieved in real time and without a timer 175.

Figure 4:
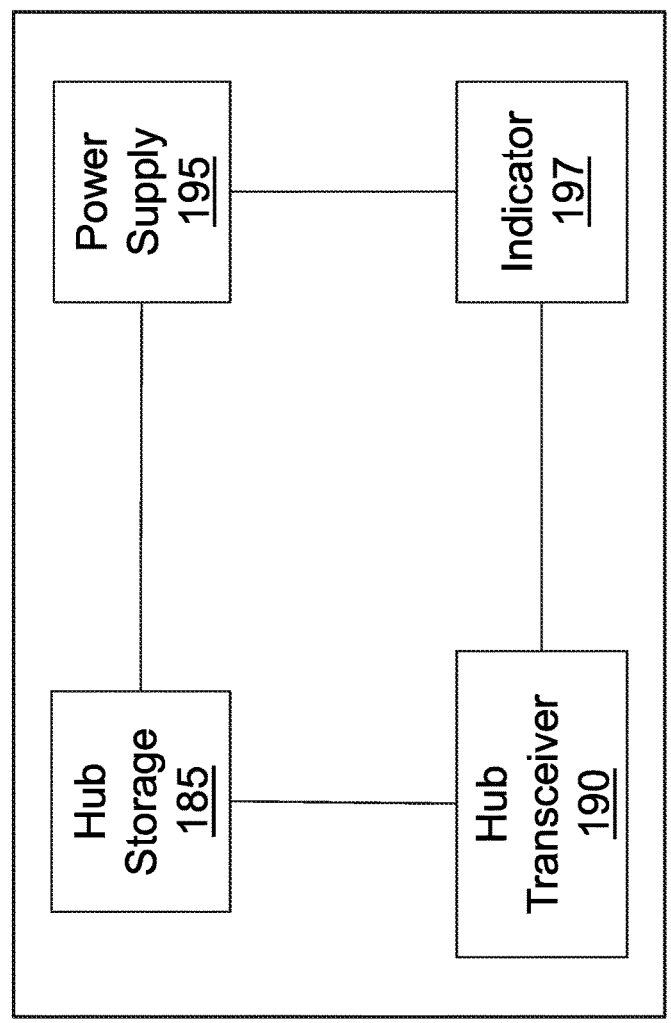
FIG. 4 is a schematic illustration of a hub according to an embodiment of the present invention.

FIG. 4 is a schematic illustration of a hub 120 according to an embodiment of the present invention. As discussed, the hub 120 can be a server that facilitates communication between the user device 100 and the storage unit 105. The hub 120 can also be a device located on or near the storage unit 105 and that provides indications to the user based on data stored, for example, in the storage medium 160 of the storage unit 105.

As shown, the hub 120 includes a hub storage 185, a hub transceiver 190, and a hub power supply 195, which can be any device described above with respect to the storage medium 130, transceiver 140, and power supply 150, respectively. The hub transceiver 190 can communicate with the transceiver 140 of the user device 100 or the toolbox transceiver 155 of the storage unit 105. The communicated information can be stored in the hub storage 185 and transmitted by the hub transceiver 190. Such information can include tamper attempts, a lock status of the storage unit 105, a log of users who unlocked the storage unit 105, identification numbers or names of individuals authorized to unlock the storage unit, and others.

The hub 120 can also include an indicator 197 that provides an indication to the user as to any of the data above. The indicator 197 can be provided on the hub 120, or can be part of the storage unit 105 or user device 100 themselves. For example, the indicator 197 can provide a visual, audible, tactile, or other form of alert to a user. The indicator 197 can blink red, for instance, if the storage unit 105 has been tampered with. Any other manner of indication can be implemented without departing from the spirit and scope of the present invention.

Figure 5:
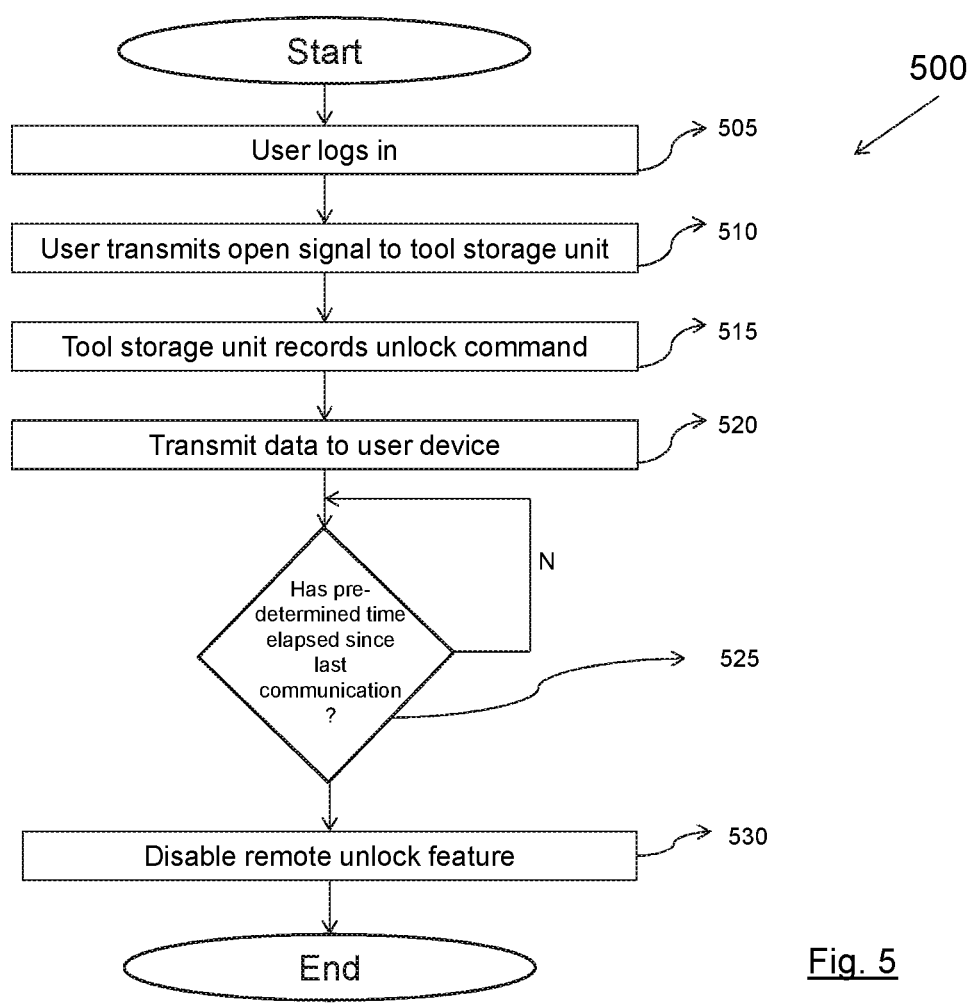
FIG. 5 is a flowchart illustrating a process of using the system according to an embodiment of the present invention.

FIG. 5 is a flow chart of a process 500 for using the system 10 according to an embodiment of the present invention. The process 500 begins and proceeds to step 505, where a user logs in to their account. For example, a user may enter a user name and password for an account previously set up by either the user or an administrator of the system 10. The user can therefore be identified when logging in.

The process then proceeds to step 510 where the user transmits an open signal to the storage unit 105 so as to unlock the storage unit 105. In step 515, the storage unit 105 can record the unlock signal, and the identification of the user who transmitted the unlock signal, in a log of the storage unit 105. This information, as well as other information, can be transmitted to the user device in step 520.

Step 525 determines whether a predetermined amount of time has elapsed since the prior communication between the hub 120/storage unit 105 and the user device 100. If a predetermined time has elapsed, the process proceeds to step 530, where the remote unlock feature is disabled. For example, the remote unlock feature can be disabled by disabling one of the transceivers 140, 155, 190 if the timer 175 determines a predetermined amount of time has elapsed since a communication took place. If a predetermined time has not elapsed since communications, the process 500 reverts to just prior to step 525 and only advances to step 530 when no communications are received for a predetermined period. Following step 530, the process 500 can end.

The present invention is discussed above with respect to locking or unlocking a storage unit 105. However, the storage unit 105 can have multiple drawers or sub-compartments that are individually or collectively secured. For example, a first user may have access to a first drawer with a first user device, a second user may have access to a second drawer with a second user device, and a third user may have access to all drawers with a third user device. Any other arrangement can be implemented without departing from the spirit and scope of the present invention.

As discussed herein, the term "coupled" is intended to refer to any connection, direct or indirect, and is not limited to a direct connection between two or more elements of the disclosed invention. Similarly, "operatively coupled" is not intended to mean any direct connection, physical or otherwise, and is merely intended to define an arrangement where two or more elements communicate through some operative means (e.g., through conductive or convective heat transfer, or otherwise). The term "coupled" can mean, in some embodiments, two objects being integral with one another.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A storage unit including a housing and a lock selectively disposable in either of locked and unlocked states, wherein when the lock is in the locked state the lock is adapted to maintain the housing in a closed state, and when the lock is in the unlocked state, the lock is adapted to allow access to the housing, the storage unit comprising:
   a transceiver operably coupled to the lock and adapted to receive a signal from a user device to cause the lock to be disposed in either of the locked or unlocked states;
   a timer adapted to determine an amount of time that the transceiver has not received the signal, wherein the transceiver transmits a lock command to dispose the lock in the locked state when the amount of time matches a preset amount of time; and
   a sensor adapted to sense a proximity of the user device and the locked and unlocked states of the lock, and the open and closed states of the housing, and further adapted to communicate a command to the lock, wherein the lock is disposed to the locked state when the amount of time matches the preset amount of time and the housing is in the closed state, and the lock is disallowed from being disposed in the locked state when the housing is in the open state.

2. The storage unit of claim 1, wherein the user device is a smart phone.

3. The storage unit of claim 1, wherein the user device includes a security token.

4. The storage unit of claim 1, wherein the signal includes one of either lock and unlock commands.

5. The storage unit of claim 1, wherein the command to the lock includes an unlock command if the user device is authenticated and is within a preset proximity of the sensor.

6. The storage unit of claim 1, further comprising a switch adapted to disable the transceiver.

7. The storage unit of claim 1, further comprising a storage medium adapted to store data identifying different user devices that respectively transmitted signals to the transceiver.

8. The storage unit of claim 1, further comprising a storage medium adapted to store a status of the lock indicating whether the lock is in one of the locked and unlocked states.

9. The storage unit of claim 1, wherein the sensor is further adapted to sense whether the lock has been tampered with.

10. The storage unit of claim 1, wherein the transceiver is further adapted to transmit data to the user device representing at least one of a lock status, user devices that respectively transmitted signals, and a tamper alert.

11. The storage unit of claim 1, further comprising a hub for facilitating communication between the user device and storage unit.

12. The storage unit of claim 1, further comprising an indicator adapted to indicate information, the indicator being one of a visual, audio, and tactile indicator.

13. The storage unit of claim 1, further comprising an interface in operable communication with the sensor, wherein the interface is adapted to transmit an unlock command to the lock when the sensor senses the proximity of the user and authenticates a security token of the user, and the interface is touched by the user.

14. The storage unit of claim 1, wherein the sensor communicates the command when the transceiver receives a security token from the user when the sensor is within the proximity of the user device.

* * * * *